United States Patent [19]

Gibson

[11] Patent Number: 5,081,477
[45] Date of Patent: Jan. 14, 1992

[54] METHOD AND APPARATUS FOR SYNCHRONIZING THE PEL CLOCK OF A LASER PRINTER

[75] Inventor: Bruce D. Gibson, Lexington, Ky.

[73] Assignee: International Business Machines Corporation, Armonk, N.Y.

[21] Appl. No.: 499,152

[22] Filed: Mar. 26, 1990

[51] Int. Cl.⁵ .................................. G01D 15/06
[52] U.S. Cl. .................................. 346/160; 346/108; 250/236
[58] Field of Search ............... 346/108, 160; 350/6.7, 350/6.8; 358/481; 250/237 G, 236

[56] References Cited

U.S. PATENT DOCUMENTS

| | | | |
|---|---|---|---|
| 3,750,189 | 7/1973 | Fleischer | 346/74 |
| 3,835,249 | 9/1974 | Dattilo et al. | 178/7.6 |
| 3,898,627 | 8/1975 | Hooker et al. | 340/172.5 |
| 4,000,486 | 12/1976 | Schomburg | 340/172.5 |
| 4,422,099 | 12/1983 | Wolfe | 358/293 |
| 4,490,608 | 12/1984 | Yeadon et al. | 250/237 G |
| 4,616,132 | 10/1986 | Kessler | 358/481 X |
| 4,897,675 | 1/1990 | Negishi | 346/160 X |
| 4,978,849 | 12/1990 | Goddard et al. | 346/108 X |

FOREIGN PATENT DOCUMENTS

0097918  4/1989  Japan .................................. 346/108

Primary Examiner—Benjamin R. Fuller
Assistant Examiner—Randy W. Gibson
Attorney, Agent, or Firm—F. A. Sirr; C. M. Wright

[57] ABSTRACT

In an electrophotographic printer, a moving laser beam scans a photoconductor as the beam is selectively modulated by the operation of a beam modulator. Binary print data is gated to the modulator by the operation of a picture element (PEL) clock. At the beginning of each photoconductor scan, the beam traverses an optical grating that is constructed and arranged to produce a grating clock signal whose frequency and phase are accurately related to the later position of the beam during each photoconductor scan. A controllable delay means is controlled by the grating clock signal. For the scanning of each photoconductor row, the delay means operates to bring the phase of the PEL clock into synchronism with the grating clock signal, prior to the time that the beam scans the photoconductor.

17 Claims, 4 Drawing Sheets

METHOD AND APPARATUS FOR SYNCHRONIZING THE PEL CLOCK OF A LASER PRINTER

FIELD OF THE INVENTION

This invention relates to the field of electrophotographic reproduction devices, and specifically to electrophotographic printers having print or imaging station comprising one or more scanning laser beams.

BACKGROUND OF THE INVENTION

Electrophotographic reproduction devices can generally be divided into copiers or printers. The present invention finds primary utility in printers.

In an electrophotographic printer, a charged photoconductor is selectively discharged by the operation of a print or imaging station, to provide an electrostatic latent image on the photoconductor's surface. This latent image corresponds to the visual image that is to be printed, first by applying toner to the photoconductor, and then by transferring the toner image to the surface of substrate material such as a sheet of plain paper.

Electrophotographic reproduction devices may be constructed to apply toner (i.e. develop) either the photoconductor's discharged area, or to the photoconductor's charged area. The former type device is called a discharged area developing device (i.e., a DAD device), whereas the latter device is called a charged area developing device (i.e., a CAD device). The present invention finds utility in either type of printer.

One of the more popular imaging stations used in electrophotographic printers utilizes one or more scanning laser beams. While the present invention will be described while making reference to a single scanning laser beam, it is to be understood that the spirit and scope of the invention is not to be limited thereto. The invention finds equal utility in printers having a number of scanning laser beams, and with scanning light spot printers of any type.

The broad spirit and scope of the invention are not to be limited to a scanning light beam since, as will be appreciated by those of skill in the art, such a scanning beam generally comprises a moving point, or spot of light, that can be modulated in intensity, for example on and off, to form an electrostatic latent image on the photoconductor.

Thus, the term scanning laser beam, as used herein, is intended to mean any moving point of light to which the photoconductor is sensitive, and which operates to sequentially "print" the small picture elements (PELS) of one or more image rows, as the point of light sequentially scans the photoconductor, image row after image row.

In printers of this type, the image to be printed comprises an electronic image signal that may, for example, reside in the page memory of a data processing system. In this page memory, each photoconductor PEL area that is to be discharged may, again by way of example, be represented by a binary "1", in which case each PEL that is to be left in its charged state would be represented by a binary "0". As the spot o light moves across a photoconductor PEL row, the row content of the page memory signal is gated to control or modulate the spot of light in accurate synchronism with the position of the moving spot of light.

The art has recognized the need to synchronize the gating of the print data signal to laser beam modulator means as a function of the beam's position, both prior to and during each photoconductor scan.

For example, U.S. Pat. No. 3,750,189 discloses the use of a photosensor that is located on an image plane that is established by the physical location of the photoconductor. This photosensor operates to detect the time at which a scanning laser beam begins to scan the image plane. As a result of the detection of the laser beam at this start of scan position, a timing pulse is generated to start the flow of print data to a beam modulator.

By way of another example, U.S. Pat. No. 3,835,249 describes a real time system for synchronizing the flow of print data to a beam modulator. In this device, the scanning beam is first split into two separate beams. A first scanning beam portion is used in conjunction with the modulator to print data onto a photoconductor. A second scanning beam portion is used to scan an optical grating. This second beam portion thereafter impinges upon a detector whose output continuously provides an indication of the first beam's position, as the first beam scans the photoconductor. The output of this detector is used to generate a timing signal that is used to gate print data to the printing beam's modulator. U.S. Pat. Nos. 3,898,627, 4,000,486 and 4,422,099 are generally similar in their teaching.

While prior systems of this general type provide satisfactory operation, the first exemplary system provides only initial beam position information by which print data can thereafter be gated to the laser beam, and the second of these prior systems is expensive in that it requires the use of an optical grating that is an analog of the entire scan length of the laser beam.

Thus, there remains a need in the art for a simple and inexpensive means to provide both position and phase synchronizing for the flow of print data to a scanning spot of light that scans the photoconductor of a reproduction device.

SUMMARY OF THE INVENTION

This invention relates to electrophotographic reproduction devices wherein prints are produced by first creating an electrostatic latent image on a photoconductor surface, then developing the image with toner, then transferring the toner image to print receiving material, and then fusing the toner image to the print receiving material. The above-mentioned latent image is preferably formed by the operation of a laser beam that repeatedly scans the photoconductor, PEL row after PEL row, as the beam is modulated by the operation of a modulator means.

A photodetector/optical grating means operates in accordance with the invention to provide a start of scan grating clock signal. This grating clock signal is used to synchronize the operation of a PEL clock to the position of the moving beam prior to the beginning of the scan of each photoconductor PEL row. In this way, image data is applied to the modulator means in synchronism with the position of the scanning laser beam for each and every PEL row.

As the laser beam traverses the photoconductor during the formation of one PEL row of a print image, a print image signal operates to sequentially control the modulator means in accordance with each image PEL that is to be printed for that scan row.

The present invention provides a PEL clock that runs at the required PEL row frequency, i.e., at the frequency at which print data is to be gated to the modulator means. A controllable delay means is provided to receive the output of the PEL clock. The output of this delay means thereby comprises a delayed PEL clock that is used to gate image data to the modulator means.

The above-mentioned photodetector/optical grating means is provided to detect the laser beam prior to the beam beginning a photoconductor row scan. The optical grating is constructed and arranged to provide grating intervals that are a multiple of the required PEL spacings for the photoconductor scan row, for example, the grating is a direct analog of the PEL spacing within the photoconductor row.

As the laser beam traverses this optical grating, the resulting grating clock signal is compared to the output of the delay means, i.e., to the delayed PEL clock. The phase relationship between these two pulse trains determines the amount of delay that is thereafter implemented by the delay means. As a result, the output of the delay means, i.e., the delayed PEL clock, is brought into synchronism with the grating clock, i.e., into synchronism with the position of the scanning laser beam as the beam begins its photoconductor row scan.

An object of the invention is to provide an electrophotographic printer method and apparatus having a photoconductor that moves in a given direction at a substantially uniform speed, and a spot of light that moves at a substantially uniform speed in a direction that is generally normal to the given direction. In so doing, the light spot repeatedly scans photoconductor rows as the light spot is selectively modulated by the operation of a light modulator.

Operation of the modulator is accurately synchronized to the PEL-to-PEL movement of the light spot by providing an optical grating that is scanned by the light spot at the beginning of each and every photoconductor scan row. The optical grating is constructed and arranged to produce a grating clock signal whose frequency and phase are an accurate analog of the PEL-to-PEL movement of the light spot during the initial interval of each photoconductor scan row.

A PEL clock is provided having a frequency that is an analog of light spot speed as the light spot scans a photoconductor row. However, the phase of this PEL clock may be only an inexact analog of the PEL-to-PEL movement of the light spot from one photoconductor row to the next.

A controllable delay means is connected to receive the inexact output of the PEL clock. This delay means is controlled by the grating clock signal, and operates to provide a delayed PEL clock that is an accurate analog of spot movement as the light spot scans the optical grating.

This delayed PEL clock is connected in controlling relation to the modulator, for use as the light spot scans the individual PELS of each photoconductor row.

These and other objects and advantages of the invention will be apparent to those of skill in the art upon reference to the following detailed description of the invention which description makes reference to the drawing.

DETAILED DESCRIPTION OF THE INVENTION

This invention will be illustrated within the framework of electrophotographic devices wherein prints are produced by sequentially creating an image of the print subject on a photoconductor surface, developing the image with toner, transferring the toner image to print receiving material, and then fusing the toner image to the print receiving material. In most electrophotographic machines, the electrophotographic process is of the transfer type wherein photoconductor material is placed around a rotating drum, or is arranged as a belt to be driven by a system of rollers. In a typical transfer process, photoconductor material is passed under a stationary charge generating station, to thereby place a relatively uniform electrostatic charge, usually several hundred volts, across the entirety of the photoconductor surface. Next, the photoconductor is moved to an imaging station where the photoconductor receives light rays from a light generating source. These light rays discharge the photoconductor to relatively low levels when the light source is fully powered, while the photoconductor continues to carry high voltage levels when the light source is turned off, or when it is powered at intermediate levels, or for a relatively short time duration. In that manner, the photoconductor is caused to bear an electrostatic latent charge pattern which corresponds to the printing, shading, etc., which is desired to be printed on the receiving material.

Light generating sources in an electrophotographic printer frequently comprise lasing means in which a laser beam is modulated by a character generator and a modulator to control the power or the length of time that the beam exposes the photoconductor in each particular picture element (PEL) area. In a multiple beam lasing system, modulating means may modulate more than one beam at a time so that more than one line or row of PELS may be written at a time.

After producing a latent image on the photoconductor, the latent image is moved to a developing station where developing material called toner is placed on the image. Toner is usually in the form of a colored powder which carries a charge designed to cause the powder to deposit on selected areas of the photoconductor.

The developed image is then moved from the developing station to a transfer station whereat copy receiving material, usually paper, is juxtaposed to the developed toner image, as a charge is placed on the backside of the paper, so that when the paper is thereafter stripped from the photoconductor, a toner image is held on the paper's surface as toner is concomitantly removed from the photoconductor.

The remaining electrophotographic process steps provide permanent bonding or fusing of the toner to the copy paper, and cleaning of residual toner from the photoconductor so that the photoconductor can be reused.

Figure 1:
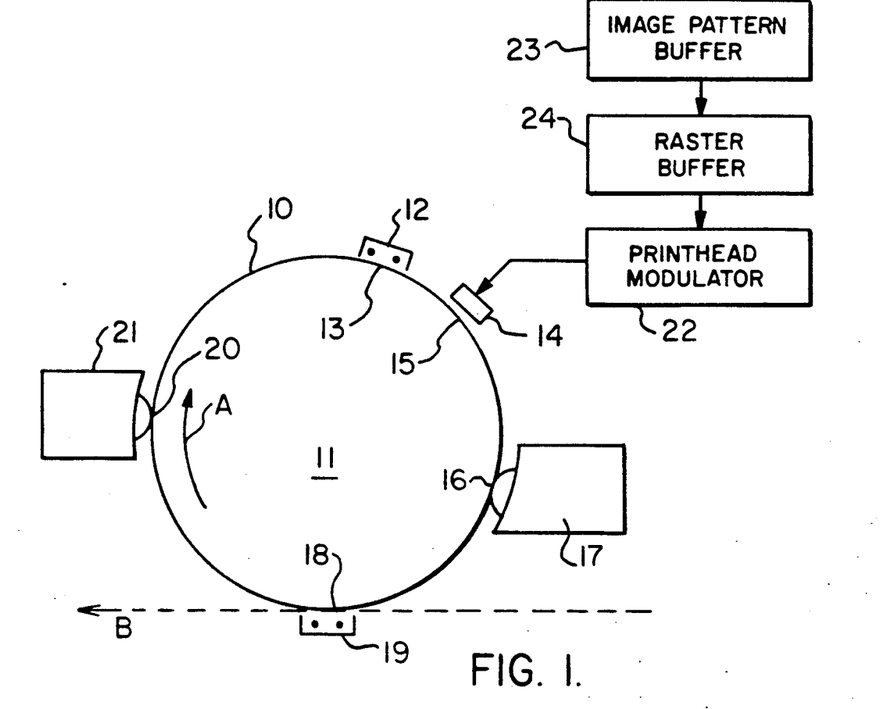
FIG. 1 is a diagrammatic representation of an electrophotographic printer embodying the invention.

FIG. 1 shows a typical electrophotographic printer incorporating this invention. Photoconductor material 10 is placed on the surface of a drum 11 which is driven by motive means, not shown, to rotate at a substantially constant speed in the direction A. A charge generator 12 places a uniform charge of several hundred DC volts across the surface of photoconductor 10 at the location of charging station 13. The charged photoconductor is mounted in a dark enclosure, not shown, and thereafter rotates to the location of a printhead 14 which is comprised of a light generating source, such as the laser beam generator shown in FIG. 2. Printhead 14 selectively exposes the charged photoconductor to light as the photoconductor passes through imaging station 15. As a result, imaging station 15 operates to discharge photoconductor 10 in areas which are desired to be developed with toner (Discharged Area Development, DAD process), or to discharge the photoconductor in areas which are to remain free of toner (Charged Area Development, CAD process).

For a DAD process, the discharged areas of photoconductor 10 are developed at developing station 16 by developer apparatus 17 which operates to apply toner so that the photoconductor thereafter carries a visually perceptible image of the print data that previously operated to control printhead 14. In a CAD process, the charged areas are developed. In either case, the developed image now rotates to transfer station 18 whereat print paper, moving in the direction B, is juxtaposed with the surface of photoconductor 10. A charge opposite in polarity to the charge on the toner is placed on the backside of the print paper by transfer charge generator 19, such that when the paper is stripped from the surface of the photoconductor, toner is attracted to the paper and leaves the surface of photoconductor 10. Any remaining residual toner is cleaned from the photoconductor at cleaning station 20 by operation of cleaning apparatus 21.

The selective application of light rays to photoconductor 10 at imaging station 15 is accomplished through operation of printhead modulator means 22. For a semiconductor laser diode, printhead modulator 22 may be comprised of a power supply, which will either turn the light source on for longer or shorter periods of time to accomplish varying degrees of photoconductor discharge, in accordance with image pattern data, or modulator 22 will turn the light-generating source on to a greater or lesser illumination intensity in accordance with that data. In any event, modulation will occur in accordance with the data contained in buffer memory 23. Print data is first sent to a raster buffer 24, and then to printhead modulator 22, as is well known by those skilled in the art.

Figure 2:
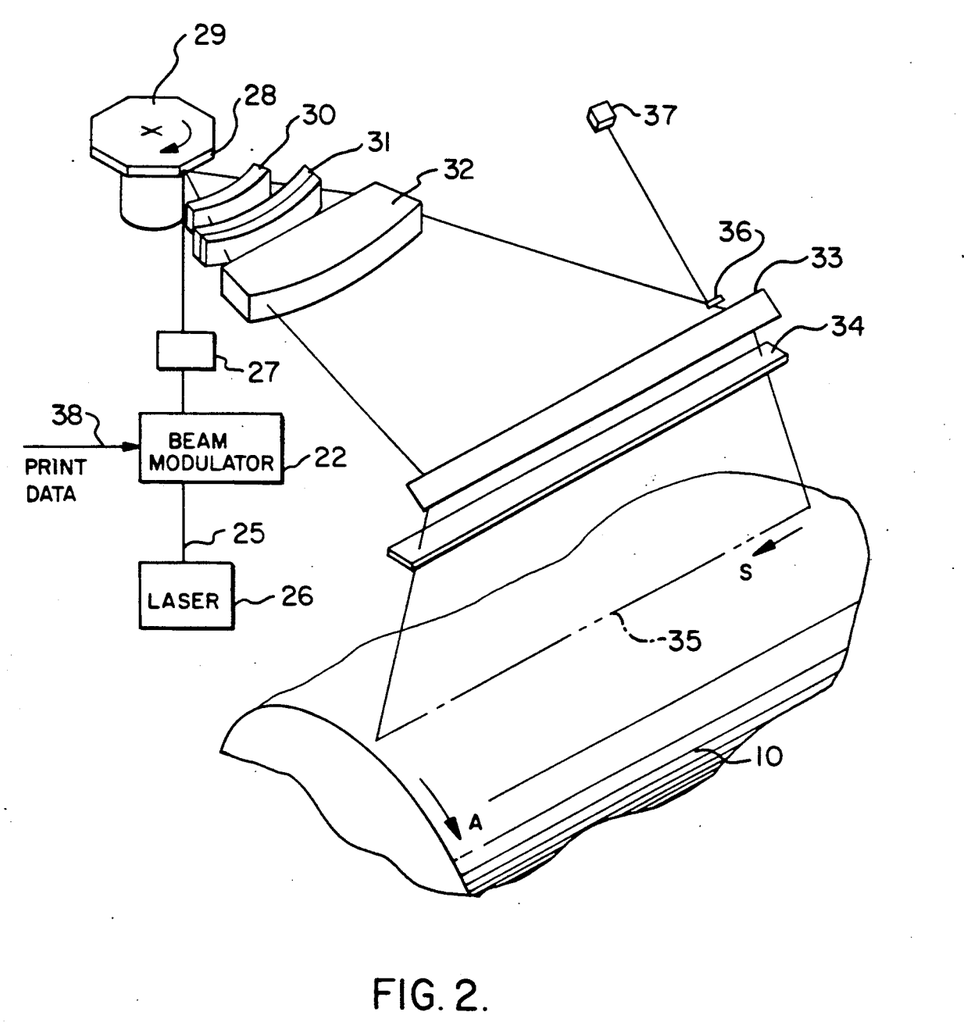
FIG. 2 is a diagram that shows the scanning laser imaging station of the FIG. 1 printer.

FIG. 2 shows an optical scanning system which can be used as printhead 14 of FIG. 1. In FIG. 2, a laser beam 25 is shown emanating from laser module 26. Beam 25 passes through beam modulator 22 and then through a cylindrical lens 27 for focusing the beam onto the facets 28 of a rotating polygon mirror 29. The beam is reflected from the moving mirror facets, and then through a negative spherical lens group 30, an anamorphic lens group 31, and a positive spherical lens group 32, to the surface of photoconductor 10. FIG. 2 also shows a fold mirror 33, an exit window 34, and the length of the scan 35 across photoconductor 10.

In one embodiment of the invention, a reflective surface 36 is provided to reflect light from the laser beam to a photodetector/optical grating means 37. Means 37 operates in accordance with the invention to provide a start of scan (SOS) grating signal or grating clock signal that is used to synchronize the application of image data 38 to modulator 22 in accordance with the position of the scanning laser beam, as will be described.

Figure 3:
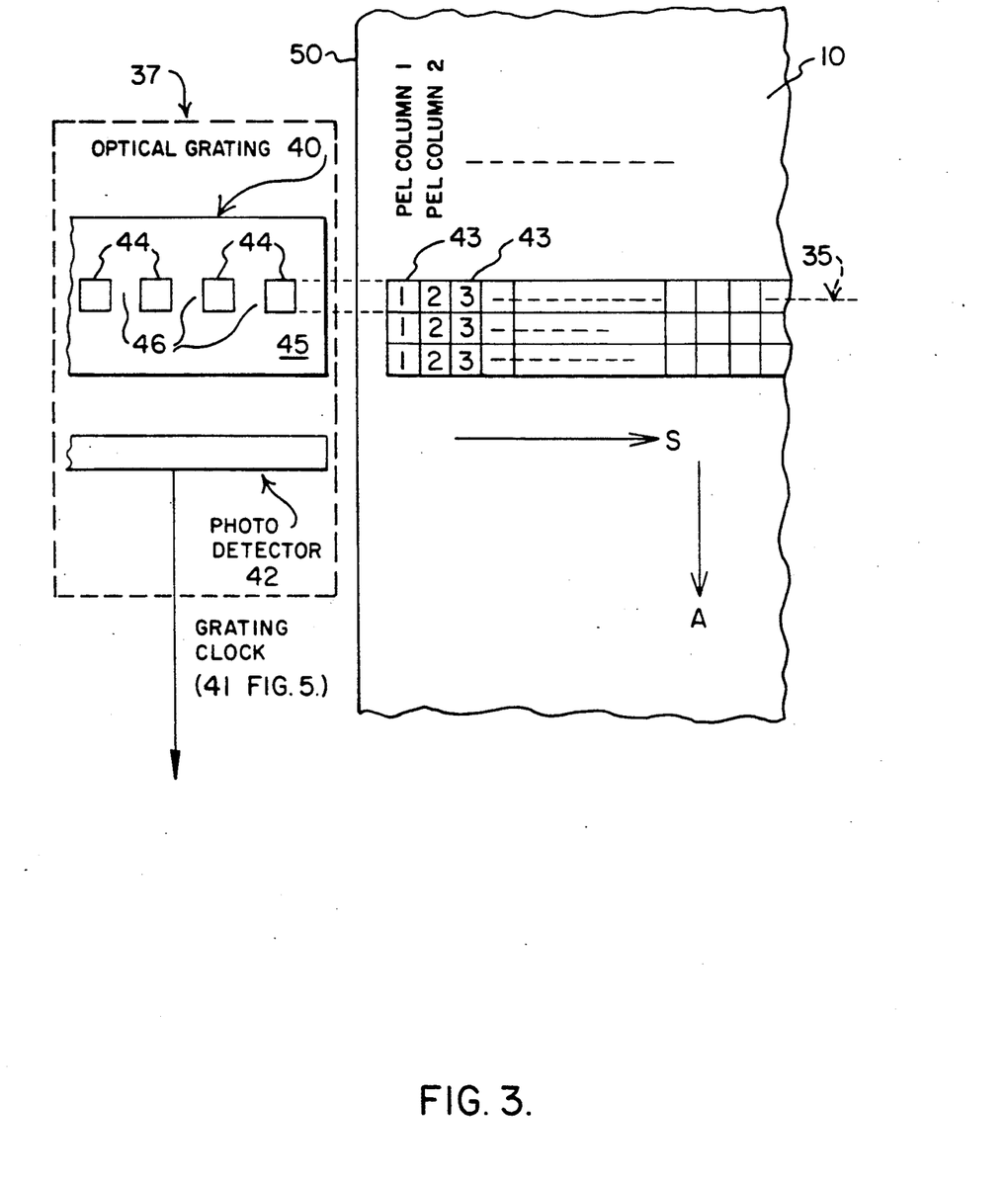
FIG. 3 is a diagrammatic representation of a number of scan PEL rows of the photoconductor shown in FIGS. 1 and 2, this figure also showing how this PEL row positionally relates to the optical grating of FIG. 2, which grating is scanned by the laser beam prior to the beam scanning each photoconductor PEL row in order to derive a grating clock signal.

It should be noted that the physical placement of photodetector/optical grating means 37 relative to photoconductor 10 is not critical to the invention. For example, it may be desirable to place this photodetector/optical grating means in the image plane of photoconductor 10, and just prior to the beginning of scan row 35, as is shown in FIG. 3.

As the laser beam traverses photoconductor scan line 35 while moving at a substantially constant speed during the formation of one PEL row of a print data image, the binary print image signal present on conductor 38 (which image signal may comprise one bit per image PEL) may operate to control modulator 22 to an on or an off state for each image PEL that is to be printed. For example, if PELS are printed at a density of 480 PELS per linear inch of scan length 35, then modulator 22 may be controlled at this same frequency. In addition, the phase at which modulator 22 is controlled during each scan line 35 must be such that the PELS of a current scan row will line up with the corresponding PELS of adjacent scan rows. In this way, parallel PEL columns (see FIG. 3) are formed, these PEL columns extending in the direction of photoconductor movement A and at the same assumed density of 480 columns per inch of scan line 35.

The exact nature of the image data signal on conductor 38 is not critical to the invention. For example, this data may include non-print edge or margin data to define the blank margin of the final print image.

The common edge of two adjacent mirror facets 28 define the end of one scan and the beginning of the next scan. As will be appreciated by those skilled in the art, if one assumes that print data 38 is being gated to modulator 22 with the proper frequency and phase to properly form the aforementioned PEL columns during a current scan, the frequency/phase relationship that was used to gate data 38 during that current scan usually cannot be used during the next scan. For this reason, the PEL clock that is used to gate data 38 to modulator 22 must be frequently resynchronized, and preferably at the beginning of every scan, in order to place the PELS of each scan at the correct linear positional relationship with respect to the previously printed scan row 35.

At low data rates for print data 38 (i.e., at a low number of PELS per second), this resynchronization can be accomplished by providing a clock that runs at a much higher rate than the PEL rate, and dividing down this high frequency clock to the lower desired PEL rate. In this type of a prior system, if the required positional accuracy within scan line 35 was one-tenth of a PEL width (where PEL width is measured in the direction of scan line 35), then a high frequency clock was required to run at a frequency that was ten times greater than the PEL frequency of scan line 35. In these prior systems, when the beam crosses a beginning of scan sensor, clock generation circuitry is triggered to begin dividing down the high frequency clock. Major problems exists in these prior systems when high PEL rates are required at scan line 35, since the frequency at which the high frequency clock runs must be correspondingly increased. For example, at a 50 megahertz PEL frequency for scan line 35, and a one-tenth PEL width positional placement requirement, a high frequency clock of at least 500 megahertz is required. Logic hardware capable of these speeds is not readily available and is very expensive.

The present invention avoids the aforementioned problems associated with the use of a high frequency clock from which a PEL clock is derived.

In essence, the present invention provides a PEL clock that runs at the required PEL frequency, i.e., at the frequency at which print data 38 is to be presented to modulator 22. A controllable delay means or module (initially having a zero delay, for example) is provided to receive the output of this PEL clock. The output of this delay means comprises the delayed PEL clock that is used to gate data to modulator 22.

An optical grating and beam detector means (see 37 of FIG. 2 and 40,42 of FIG. 3) is provided to detect the laser beam at its beginning of scan position/interval. This optical grating is constructed and arranged to provide grating intervals that are a multiple of the required PEL spacings for scan line 35 (where the multiple may be any integer, and in the embodiment of FIG. 3 is equal to 1). The number of sequential grating intervals that are provided is a function of the required or desired positional accuracy for PEL synchronization from scan row to scan row.

As the beam traverses this optical grating, the resulting grating signal pulses (provided by the grating detector) are compared to the output of the delay means, i.e., to the delayed pulses of the PEL clock. The phase relationship between these two pulse trains determines the amount of delay that is thereafter implemented by the delay means. As a result, the output of the delay means, i.e., the delayed PEL clock, is brought into synchronism with the grating signal, i.e., into synchronism with the position of the scanning laser beam as the beam begins its photoconductor scan 35.

The accuracy of this synchronization is determined by the delay step interval that is implemented by the delay means. For example, at a 50 megahertz PEL rate and a one-tenth PEL position requirement, the delay interval would be two nanoseconds.

If noise immunity is desired as a feature of the invention, the amount of delay can be iteratively increased and then decreased once initial synchronization has been achieved in order to find an average delay that achieves the synchronization to be used during photoconductor scan 35 of FIG. 2.

FIG. 3 is a diagrammatic representation of a number of scan PEL rows 35 of photoconductor 10, this figure also showing how the current PEL row 35 positionally relates to an optical grating 40 that is located within the photodetector/optical grating means 37 of FIG. 2. In this embodiment of the invention, grating 40 is located at the scan image plane that is established by photoconductor 10. Grating 40 is scanned by the laser beam prior to the beam scanning a photoconductor PEL row 35. The light that passes through the grating's transparent portions 44 impinges upon a photodetector 42 (also located within the photodetector/optical grating means 37 of FIG. 2). As a result, photodetector 42 generates a grating clock signal 41.

Each PEL row 35 is shown as comprising a large number of equal size and individual PEL areas 43 that are essentially square (the shape of the PEL areas is not critical to the invention). For example, photoconductor 10 contains 480 PEL areas 43 per linear inch in both scan direction S and photoconductor movement direction A. For purposes of explanation only, the first three PEL areas of the photoconductor scan rows 35 are identified as PELS 1, 2 and 3. Each PEL 1 comprises a PEL within a column of PELS that are identified as PEL column 1. Likewise, PELS 2 and 3 reside in like-numbered PEL columns.

Optical grating 40 comprises an opaque member 45, for example, a thin film or mask having a series of equally spaced and sized transparent areas or openings 44 that are separated by similar sized and intervening opaque areas 46. In this embodiment of the invention, but without limitation thereto, transparent areas 44 and intervening opaque areas 46 of optical grating 40 comprise an analog of the size and spacing of the PEL areas 43 within scan row 35.

Photodetector 42 operates to detect the scanning laser beam as the beam traverses optical grating 40, while the beam moves linearly with scan row 35 and in the direction of scan S. As a result of the detection of this moving beam, photodetector 42 generates grating clock signal 41 (FIG. 7) having positive pulses corresponding to the time period during which the laser beam passes through a transparent portion 44 of grating 40. The positive going edge of each positive pulse within grating clock signal 41 predicts the beginning of a PEL area 43 of row 35, and the negative going edge 48 of the same positive pulse within grating clock signal 41 predicts the beginning of the next adjacent PEL area 43 of row 35.

In accordance with the invention, grating clock signal 41 is available (i.e., exists) for only a short time interval prior to the beginning of each photoconductor scan row 35. During this pre-scan interval, the cycles of a delayed PEL clock signal (see FIGS. 4 and 5) are synchronized to the cycles of grating clock signal 41. The number of synchronizing cycles that are provided by grating clock 41 is not critical to the invention, and varies as a direct function of the length of optical grating 40 (grating length is measured in the direction of scan S), i.e., a longer grating 40 provides a greater number of synchronizing cycles prior to the laser beam beginning a scan of photoconductor row 35. The important function of grating clock signal 41 is that this signal's prediction of the future physical location of the individual PELS 43 within photoconductor scan row 35 is used, in accordance with the invention, to delay (if a delay is necessary) the cycles of a delayed PEL clock signal whose function it is to gate image data to modulator 22 (FIG. 2), so as to "print" all photoconductor PELS 43 in the proper PEL columns, scan row after scan row. As will be apparent, the synchronized and delayed PEL clock signal is thereafter available during the entire scan of a photoconductor row 35, and after grating clock signal 41 has terminated.

Figure 4:
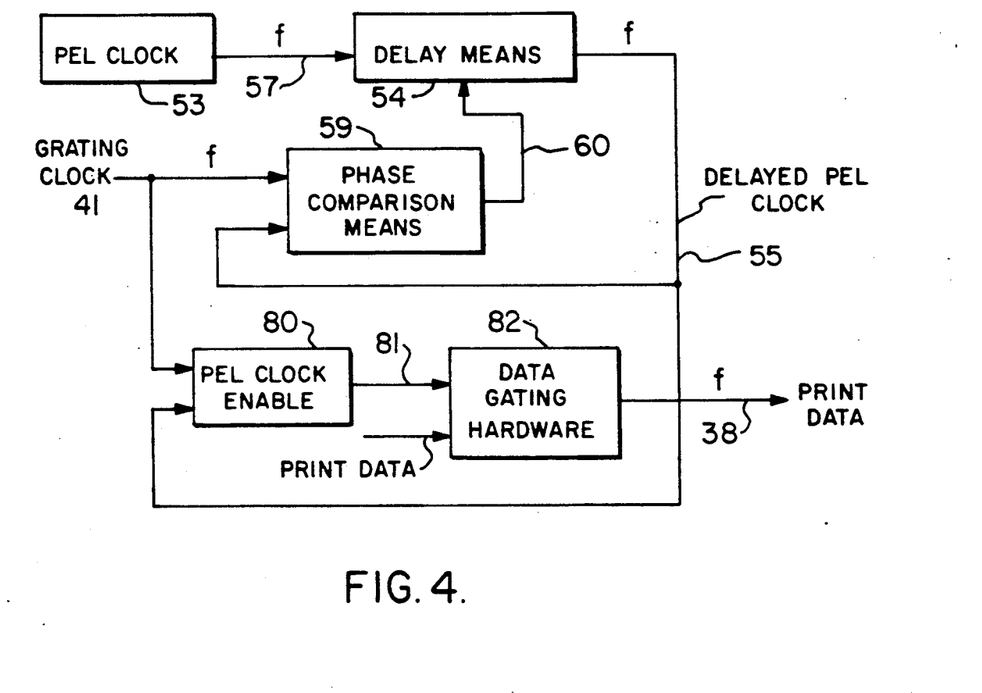
FIG. 4 shows circuit means in accordance with the invention, whereby the phase of the delayed PEL clock is compared to the phase of the grating clock of FIG. 3, to thereby control a delay means so as to bring the delayed PEL clock into phase synchronism with the grating clock.

FIG. 4 shows a circuit means in accordance with the invention, whereby the phase of the above-mentioned delayed PEL clock signal 55 is compared to the phase of grating clock signal 41, to thereby control delay means 54 so as to bring delayed PEL clock signal 55 into phase synchronism with grating clock signal 41.

Note that the symbol "f", as used in FIG. 4, indicates that the frequency of the signal present on the associated conductors are all of the same frequency, this being the frequency at which the image or print data is to be applied to modulator 22 of FIG. 2.

Figure 5:
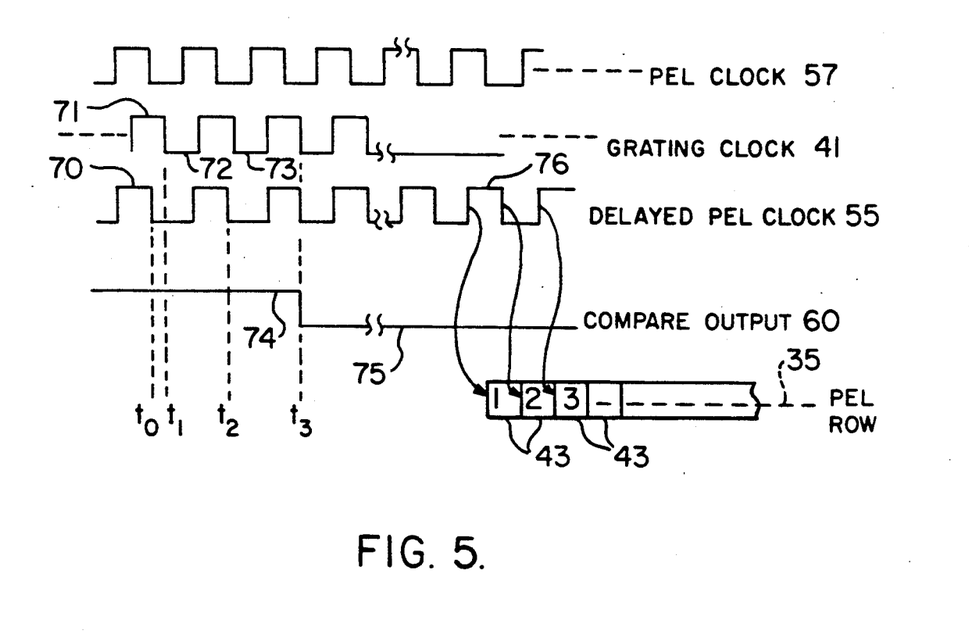
FIG. 5 shows representative waveforms for the circuit means of FIG. 4 wherein three cycles of clock comparison operate to increase the delay of the FIG. 4 delay means in two equal size steps, in order to bring the delayed PEL clock signal into synchronism with the grating clock signal, the delayed and synchronized PEL clock thereafter being effective to gate print data to the modulator means of FIG. 2.

Grating clock signal 41 is available only during the initial portion of the beam's scan movement, and as the beam traverses optical grating 40 on its way to the leading edge 50 (FIG. 3) of photoconductor 10. In FIG. 5, but without limitation thereto, an exemplary four cycles of grating clock signal 41 are shown. PEL clock 53 runs continuously, and effectively operates to gate print data to modulator 22 by way of delayed PEL clock signal 55. The output 57 of PEL clock 53 is delayed by the operation of a controllable delay means 54. The details of construction of delay means 54 are not critical to the invention and are well known to those of skill in the art, for example, a programmable delay means can be used.

Initially, but without limitation thereto, delay means 54 is controlled so as to implement zero delay at the beginning of a beam scan interval, i.e., just prior to the scanning of optical grating 40. For example, an end of scan detector (not shown) may be used to detect the laser beam at the end of each scan row 35, and to then reset delay means 54 to a zero delay condition.

The output of delay means 54 comprises the above-mentioned delayed PEL clock signal 55.

A signal comparison means, in the form of phase comparison means 59, operates to compare the phase of grating clock signal 41 to the phase of delayed PEL clock signal 55. In the arrangement of FIG. 4, grating clock signal 41 is the master input and delayed PEL clock signal 55 is the slave input. As long as a phase compare is not detected, an active compare output is provided on conductor 60, and increasing delay is implemented by delay means 54, for example, in two equal size steps as shown in FIG. 5.

Grating clock signal 41 is also applied as one input to a PEL clock enable network 80. Grating clock signal 41 operates to enable network 80 upon the termination of signal 41, i.e., after delayed PEL clock signal 55 has been phase synchronized to signal 41. A second input to network 80 comprises delayed PEL clock signal 55.

The output 81 of enable network 80 comprises delayed PEL clock signal 55, and this output is applied as one input to data gating hardware network 82. Print data, as is supplied for example by a data processing means (not shown), is applied as a second input to network 82. As a result of the above-mentioned control of delay means 54, delayed PEL clock signal 55 operates to gate the print data to modulator 22 of FIGS. 1 and 2, so as to accurately form the PEL columns shown in FIG. 3.

The manner of operating data gating hardware network 82 is not critical to the invention, and various such means well known to those of skill in the art can be provided. For example, network 82, which receives output 81 only after grating clock signal 41 has terminated and delayed PEL clock signal 55 has been synchronized, may operate to count cycles of delayed PEL clock signal 55 and to begin gating print data to modulator 22 in accordance with the position of the scanning beam, as the beam traverses the leading margin of photoconductor 10 (i.e., the left hand margin as shown in FIG. 3). As an alternative, the print data may include a sequence of binary bits that define a blank margin area (for example, a photoconductor erase area) corresponding to this leading margin of the photoconductor, and perhaps additionally to the blank margin of the image row that is currently being printed.

By way of example, FIG. 5 shows representative waveforms for continuous PEL clock output 57, momentary grating clock signal 41, continuous delayed PEL clock signal 55 and compare output 60. In this example, three cycles of clock comparison operate to increase the delay that is provided by delay means 54 in two equal steps, in order to bring delayed PEL clock signal 55 into synchronism with grating clock signal 41. The delayed and synchronized PEL clock signal 55 is thereafter effective to gate print data to the modulator means 22 of FIG. 2. As can be seen from FIG. 4, delayed PEL clock signal 55 is derived from PEL clock output 57 by way of controllable delay means 54.

Arbitrarily picking a time t0 at which to begin analyzing the operation of FIG. 4 with reference to the waveforms of FIG. 5, it is noted that the negative going edge of delayed PEL clock pulse 70 occurs prior to the time t1 at which the negative going edge of the corresponding grating clock pulse 71 occurs. As a result of this detected lack of comparison, as is detected by phase comparison means 59 (FIG. 4), compare output signal 60 is active, to thereby implement a step increase in the delay of PEL clock output 57 by delay means 54, thus providing a lengthened negative period 72 for delayed PEL clock signal 55.

At the next comparison cycle time t2, again a lack of phase synchronization is detected, and again a lengthened negative period 73 is implemented for delayed PEL clock signal 55.

However, as a result of these two lengthened negative periods 72,73 in delayed PEL clock signal 55, at the time t3 of the next comparison cycle, phase synchronization is detected by phase comparison means 59, and as a result, compare output signal 60 undergoes a transition from active state 74 to an inactive state 75, as is shown in FIG. 5. This two step delay is thereafter held by delay means 54 during the entire time of the scan of this particular photoconductor row 35.

As shown in FIG. 5, as soon as the scanning laser beam reaches the location of PEL 1 of this scan row 35, the positive going edge of delayed PEL clock pulse 76 operates to gate print data to modulator 22 as is required to print this PEL, and the later occurring negative going edge of pulse 76 operates to gate print data to PEL 2 of this photoconductor row 35.

In this manner, the invention provides a method and an apparatus for synchronizing delayed PEL clock signal 55 immediately prior to the beginning of each scan of a photoconductor row 35, in that at the beginning of each photoconductor scan, the laser beam first traverses optical grating 40 that is constructed and arranged to produce a grating clock signal 41 whose frequency and phase are accurately related to the position of the beam during the initial portion of that particular photoconductor scan. Controllable delay means 54 is controlled by grating clock signal 41 by way of operation of phase comparison means 59, and operates to bring the phase of delayed PEL clock signal 55 into synchronism with grating clock signal 41 prior to the time that the beam actually begins scanning the PEL areas 43 of photoconductor 10.

While the invention has been described with reference to preferred embodiments thereof, it is readily appreciated that those skilled in the art will visualize yet other embodiments that are within the spirit and scope of this invention. Thus, it is intended that this invention be limited solely by the following claims.

What is claimed is:

1. A method for synchronizing operation of a PEL clock to movement of a light spot prior to beginning a photoconductive scan row for an electrophotographic printer having a photoconductor that moves in a given direction at a substantially constant speed, and a spot of light that moves at a substantially constant speed in a direction that is generally normal to said given direction, and in so doing repeatedly scans photoconductor picture element (PEL) scan rows as said light spot is selectively modulated by operation of modulator means, and wherein print data is gated to said modulator means by operation of a PEL clock, the method comprising the steps of;
providing optical grating means that is scanned by said light spot prior to beginning each photoconductor scan row, said optical grating means being constructed and arranged to produce a grating clock signal whose frequency and phase are an analog to subsequent scan movement of said light spot during each photoconductor scan row,
providing PEL clock means for supplying an output signal that may be an inexact analog to scan movement of said light spot,
providing controllable delay means connected to receive said output of said PEL clock means, said delay means being operable to provide a delayed PEL clock output,
connecting said grating clock signal in controlling relation to said delay means so as to bring said delayed PEL clock signal into synchronism with movement of said light spot as said light scans said optical grating means, and
connecting said delayed PEL clock output in controlling relation to said modulator means.

2. The method of claim 1 wherein each of said photoconductor PEL rows comprises a series of individual and substantially equal size PEL areas, and wherein said optical grating means comprises alternating opaque and transparent areas that comprise a positional analog to adjacent PEL areas of said photoconductor PEL rows, said grating means being located to be scanned prior to scanning a photoconductor scan row such that said grating clock signal comprises an accurate prediction of subsequent movement of said light spot relative to individual PELS of a photoconductor scan row.

3. The method of claim 2 wherein said delayed PEL clock output is of controllable phase, and wherein said delay means operates to bring said phase of said delayed PEL clock output into synchronism with said grating clock signal prior to said light spot scanning a photoconductor scan row.

4. The method of claim 3 wherein said moving spot of light comprises a laser beam that scans said photoconductor by virtue of operation of moving mirror means.

5. The method of claim 1 wherein step of connecting said grating clock signal in controlling relation to said delay means includes the steps of comparing said delayed PEL clock output to said grating clock signal, and controlling said delay means so as to bring said delayed PEL clock output into synchronism with said grating clock signal.

6. The method of claim 5 wherein said grating clock signal and said delayed PEL clock output are of essentially identical frequency, wherein said delayed PEL clock output is of a controllable phase, and wherein said comparing step operates to compare said phase of said delayed PEL clock output to said phase of said grating clock signal.

7. The method of claim 6 wherein each of said photoconductor scan rows comprises a series of individual and substantially equal size PEL areas, and wherein said optical grating means comprises alternating opaque and transparent areas that comprise a positional analog to adjacent PEL areas of said photoconductor scan rows, said grating means being located to be scanned prior to scan of a photoconductor scan row such that said grating clock signal comprises an accurate prediction of subsequent movement of said light spot relative to individual PELS of a photoconductor scan row.

8. The method of claim 7 wherein said delay means operates to bring said phase of said delayed PEL clock output into synchronism with said grating clock signal prior to said light spot scanning a photoconductor scan row.

9. The method of claim 8 wherein said moving spot of light comprises a laser beam that scans said photoconductor by virtue of operation of moving mirror means.

10. An electrophotographic printer comprising;
photoconductor means movable in a given direction at a substantially uniform speed,
printing light spot means for scanning picture element (PEL) rows of said photoconductor means, said light spot means being movable at a substantially uniform speed in a direction that is generally normal to said given direction,
modulator means for said light spot means operable to modulate said light spot means in accordance with PEL print data as said light spot means scans said photoconductor PEL rows from a beginning of a photoconductor PEL row to an end of a photoconductor PEL row, said light spot means thereby operating to sequentially scan said photoconductor PEL rows as said light spot is selectively modulated by operation of said modulator means;
optical grating means located to be scanned by said light spot means prior to said beginning of each photoconductor PEL row, said optical grating means being constructed and arranged to produce a grating clock as a result of being scanned by said light spot means, said grating clock having a frequency and a phase that is a positional analog of movement of said light spot means during scanning of said grating means,
PEL clock means for supplying an output signal that may be an inexact positional analog to movement of said light spot means,
controllable delay means connected to receive said output of said PEL clock means, said delay means being operable to controllably provide a delayed PEL clock therefrom,
means for connecting said grating clock in controlling relation to said delay means so as to bring said delayed PEL clock into synchronism with movement of said light spot means as said light spot means scans said optical grating means, and
means for connecting said delayed PEL clock in controlling relation to said modulator means.

11. The apparatus of claim 10 including comparison means receiving as inputs said grating clock and said delayed PEL clock and having an output connected in controlling relation to said delay means.

12. The apparatus of claim 11 wherein each of said photoconductor PEL rows comprises a series of individual and substantially equal size PEL areas, and wherein said optical grating means includes alternating opaque and transparent areas that comprise a positional analog of adjacent PEL areas of said photoconductor PEL rows, said grating means being located to be scanned prior to scan of a photoconductor PEL row, such that said grating clock comprises an accurate prediction of subsequent movement of said light spot means relative to individual PELS of a photoconductor PEL row.

13. The apparatus of claim 12 wherein said grating clock delayed PEL clock are of essentially identical frequency wherein said delay means operates to bring said phase of said delayed PEL clock into synchronism with said grating clock prior to said light spot means scanning a photoconductor PEL row.

14. The apparatus of claim 13 wherein said light spot means comprises a laser beam that scans said photoconductor by virtue of the operation of moving polygon mirror means.

15. Printer apparatus for use in printing a plurality of picture element (PEL) rows, each row of which comprises a plurality of equally spaced and individual PELS sequentially identified as PEL-1 to PEL-N, onto the surface of a medium as said medium moves in a given direction at a substantially constant speed, by use of scanning print means that prints individual PELS of a row in sequence from PEL-1 to PEL-N as said print means scans said medium while moving at a substantially constant speed in a direction that is generally normal to said given direction, like identified PELS of said plurality of rows occupying like identified PEL columns that extend in said given direction, comprising;

PEL clock means for providing a PEL clock signal that is an inexact positional indication of said PEL columns as said print means scans a row.

controllable delay means operable to receive said PEL clock signal for providing an output that comprises a delayed PEL clock signal that is dependent upon control of said delay means;

grating means cooperating with said print means at a physical location prior to a subsequent location whereat said print means begins to print PEL-1 of a row, said grating means operating as a result of said cooperation with said print means to provide a grating clock signal that comprises an accurate prediction of future column positions of said print means as said print means for prints PELS of a row, phase comparison means for receiving as an input said grating clock signal and said delayed PEL clock signal, and providing an output signal that comprises an indication of phase difference between said grating clock signal and said delayed PEL clock signal, and means for connecting said output signal of said comparison means in controlling relation to said delay means in a manner to reduce said phase difference between said delayed PEL clock signal and said grating clock signal to a minimum to thereby ensure that individual PELS of each of said rows occupy a PEL position within a corresponding PEL column.

16. The apparatus of claim 15 wherein said print medium comprises a light sensitive medium, wherein said print means comprises a scanning light spot whose intensity is modulated in accordance with print data for each individual PEL of each row, and wherein said delayed PEL clock is connected in controlling relation to modulation of said light spot by said print data.

17. The apparatus of claim 16 wherein said light spot comprises a scanning laser beam.

* * * * *